US011496473B2

(12) United States Patent
Lu

(10) Patent No.: US 11,496,473 B2
(45) Date of Patent: *Nov. 8, 2022

(54) SYSTEMS AND METHODS FOR INTERACTION AMONG TERMINAL DEVICES AND SERVERS

(71) Applicant: Advanced New Technologies Co., Ltd., George Town (KY)

(72) Inventor: Hua Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 83 days.

This patent is subject to a terminal disclaimer.

(21) Appl. No.: 16/711,379

(22) Filed: Dec. 11, 2019

(65) Prior Publication Data

US 2020/0120093 A1 Apr. 16, 2020

Related U.S. Application Data

(62) Division of application No. 14/885,584, filed on Oct. 16, 2015, now Pat. No. 10,542,000.

(30) Foreign Application Priority Data

Oct. 17, 2014 (CN) .......................... 201410553465.X

(51) Int. Cl.
*H04L 9/40* (2022.01)
*G06F 21/44* (2013.01)
*H04L 67/52* (2022.01)

(52) U.S. Cl.
CPC .......... *H04L 63/0876* (2013.01); *G06F 21/44* (2013.01); *H04L 67/52* (2022.05)

(58) Field of Classification Search
CPC ...... H04L 63/0876; H04L 67/18; G06F 21/44
See application file for complete search history.

(56) References Cited

U.S. PATENT DOCUMENTS 308,251 A ‡ 11/1884 Greer ...................... B21G 3/00
470/39
751,243 A ‡ 2/1904 Austin ................... A63H 19/10
105/49

(Continued)

FOREIGN PATENT DOCUMENTS

CN 101330384 B ‡ 12/2011
CN 102681958 ‡ 9/2012

(Continued)

OTHER PUBLICATIONS

Second Chinese Office Action issued in Chinese Application No. CN201410553465.X, dated Aug. 14, 2018 (11 pages).‡

(Continued)

*Primary Examiner* — Jason Chiang
(74) *Attorney, Agent, or Firm* — Finnegan, Henderson, Farabow, Garrett & Dunner, LLP

(57) ABSTRACT

System and method are disclosed for providing authentication of a terminal device. One embodiment includes a method implemented by a first terminal device. The method may include receiving first location information and receiving a first predetermined signal. The method may also include transmitting status information and the first location information to a server upon receiving the first predetermined signal to allow the server to compare the first location information with second location information received from a second terminal device and to allow the server to transmit the status information to the second terminal device. The status information may indicate that the first terminal device is authenticated and the first location information may indicate a current location of the first terminal device.

12 Claims, 13 Drawing Sheets

(56) References Cited

U.S. PATENT DOCUMENTS

| | | | | |
|---|---|---|---|---|
| 7,308,251 B2 ‡ | 12/2007 | Karaoguz | H04L 63/083 | 455/41 |
| 7,581,243 B2 ‡ | 8/2009 | Shigeeda | H04L 9/0863 | 380/27 |
| 7,930,536 B2 ‡ | 4/2011 | Takabayashi | H04L 63/08 | 713/15 |
| 7,975,293 B2 ‡ | 7/2011 | Yoshida | G06F 21/33 | 713/17 |
| 8,220,034 B2 ‡ | 7/2012 | Hahn | H04L 63/083 | 726/2 |
| 8,625,796 B1 * | 1/2014 | Ben Ayed | H04W 12/068 | 380/258 |
| 8,646,060 B1 ‡ | 2/2014 | Ben Ayed | H04L 63/0853 | 726/9 |
| 8,800,007 B1 * | 8/2014 | Rajagopalan | H04L 63/0272 | 713/173 |
| 8,914,861 B2 ‡ | 12/2014 | Wei | H04L 63/08 | 726/7 |
| 9,014,666 B2 ‡ | 4/2015 | Bentley | G06F 21/34 | 455/41 |
| 9,014,861 B2 ‡ | 4/2015 | Attia | H02P 9/007 | 290/44 |
| 9,350,717 B1 * | 5/2016 | Siddiqui | H04L 63/08 | |
| 9,451,443 B1 * | 9/2016 | Martell | H04W 4/021 | |
| 2006/0036858 A1 ‡ | 2/2006 | Miura | H04L 63/08 | 713/17 |
| 2006/0212709 A1 * | 9/2006 | Kinoshita | H04W 12/06 | 713/176 |
| 2007/0145945 A1 * | 6/2007 | McGinley | H02J 7/00 | 320/114 |
| 2009/0037734 A1 ‡ | 2/2009 | Kito | G06F 21/35 | 713/16 |
| 2010/0223663 A1 ‡ | 9/2010 | Morimoto | G06F 21/64 | 726/7 |
| 2010/0317323 A1 * | 12/2010 | Facemire | H04L 63/107 | 455/411 |
| 2011/0082767 A1 ‡ | 4/2011 | Ryu | G06Q 20/40 | 705/26 |
| 2011/0131104 A1 ‡ | 6/2011 | Rose | G06Q 20/20 | 705/17 |
| 2012/0144007 A1 * | 6/2012 | Choong | H04L 65/1083 | 709/223 |
| 2012/0191614 A1 * | 7/2012 | Babitch | G06Q 20/40 | 705/71 |
| 2012/0198353 A1 * | 8/2012 | Lee | G06F 3/017 | 715/748 |
| 2013/0212287 A1 * | 8/2013 | Chappelle | H04M 3/42263 | 709/227 |
| 2013/0326607 A1 ‡ | 12/2013 | Feng | H04L 63/10 | 726/7 |
| 2014/0173695 A1 * | 6/2014 | Valdivia | H04W 12/06 | 726/4 |
| 2014/0219515 A1 * | 8/2014 | Karakotsios | G06K 9/00167 | 382/115 |
| 2014/0351370 A1 * | 11/2014 | Ashley | H04L 67/148 | 709/217 |
| 2014/0359709 A1 * | 12/2014 | Nassar | H04L 65/1083 | 726/4 |
| 2015/0020185 A1 * | 1/2015 | McDonough | H04L 63/08 | 726/9 |
| 2015/0112868 A1 * | 4/2015 | Swamy | G07F 7/0873 | 705/65 |
| 2015/0121482 A1 * | 4/2015 | Berman | H04L 63/10 | 726/5 |
| 2015/0256973 A1 * | 9/2015 | Raounak | H04L 63/08 | 726/7 |
| 2015/0281235 A1 * | 10/2015 | D'Argenio | G06F 21/34 | 726/7 |

FOREIGN PATENT DOCUMENTS

| | | | |
|---|---|---|---|
| CN | 103457923 | ‡ | 12/2013 |
| CN | 104052751 | ‡ | 9/2014 |
| CN | 104092657 | ‡ | 10/2014 |
| CN | 104244227 A | ‡ | 12/2014 |
| EP | 2058748 A1 | ‡ | 5/2009 |
| WO | WO 2006/105380 A1 | ‡ | 10/2006 |
| WO | WO 2014/104436 A1 | ‡ | 7/2014 |
| WO | WO 2015/098172 A1 | ‡ | 7/2015 |
| WO | WO 2016/061510 A1 | ‡ | 4/2016 |

OTHER PUBLICATIONS

First Chinese Office Action issued in Chinese Application No. CN201410553465.X, dated Feb. 2, 2018 (25 pages).‡

First Chinese Search Report issued in Chinese Application No. CN201410553465.X, dated Jan. 24, 2018, 1 page.‡

PCT International Search Report and Written Opinion dated Jan. 12, 2016, issued in corresponding International Application No. PCT/US2015/56028 (9 pages).‡

\* cited by examiner
‡ imported from a related application

SYSTEMS AND METHODS FOR INTERACTION AMONG TERMINAL DEVICES AND SERVERS

CROSS REFERENCE TO RELATED APPLICATION

This application is a divisional of U.S. patent application Ser. No. 14/885,584, filed on Oct. 16, 2015, which is based upon and claims the benefit of priority to Chinese Application No. 201410553465.X, filed Oct. 17, 2014, both of which are incorporated herein by reference in their entireties.

TECHNICAL FIELD

The present application relates to the field of data communications, and more particularly, to systems and methods for interaction between terminal devices and between a terminal device and a server.

BACKGROUND

A user may visit websites or use applications (e.g., software applications installed on a desktop/laptop computer or on a mobile device) as daily routines. Usually, if the user has an account with a website or an application, the user may log in to the website or application with the account and corresponding password. Based on the login information, the user may be authenticated by the website or application, and the user may then access data in accordance with appropriate access levels.

In some cases, the user may wish to login to the website or application on two or more terminal devices with the same account. For example, the user may wish to login to an account from a computer (e.g., desktop or laptop computer) after logging in to the same account on a website or an application on a mobile phone. On the other hand, the user may wish to log in to an account from a mobile phone after logging in to the same account on a computer.

Currently, after logging in to one terminal device (e.g., a desktop/laptop computer or a mobile device), the user still needs to re-enter the account and password information in order to be authenticated again when logging in to another terminal device. This operation is duplicative and time consuming, and fails to meet the growing demand for easy and convenient operations.

SUMMARY

One aspect of the present disclosure is directed to a method, implemented by a first terminal device, for providing authentication on a second terminal device. The method may includes receiving, by a processor device of the first terminal device, first location information and receiving, by the processor device, a first predetermined signal. The method may also include transmitting status information and the first location information to a server upon receiving the first predetermined signal to allow the server to compare the first location information with second location information received from the second terminal device and to allow the server to transmit the status information to the second terminal device. The status information may indicate that the first terminal device is authenticated and the first location information indicates a current location of the first terminal device.

Another aspect of the present disclosure is directed to a method, implemented by a processor device of a server, for providing authentication. The method may includes receiving, from a first terminal device, status information and first location information. The status information may indicate that the first terminal device is authenticated and the first location information may indicate a current location of the first terminal device. The method may also include receiving, from a second terminal device, second location information indicating a current location of the second terminal device. The method may further include comparing the first and second location information to determine whether the current locations of the first and second terminal devices are substantially the same. When it is determined that the current locations of the first and second terminal devices are substantially the same, the method may include transmitting the status information to the second terminal device to authenticate the second terminal device.

Another aspect of the present disclosure is directed to a terminal device. The terminal device may include a transceiver device that transmits or receives information from a server. The transceiver device may also include a processor device. The processor device may receive first location information and may receive a first predetermined signal. The processor device may also control the transceiver to transmit status information and the first location information to the server upon receiving the first predetermined signal to allow the server to compare the first location information with second location information received from a second terminal device and to allow the server to transmit the status information to the second terminal device. The status information may indicate that the first terminal device is authenticated and the first location information may indicate a current location of the first terminal device.

Another aspect of the present disclosure is directed to a server. The server may include a transceiver device that transmits or receives information from first and second terminal devices. The server may also include a processor device. The processor device may receive, from a first terminal device, status information and first location information. The status information may indicate that the first terminal device is authenticated and the first location information may indicate a current location of the first terminal device. The processor device may also receive, from a second terminal device, second location information indicating a current location of the second terminal device. The processor device may further compare the first and second location information to determine whether the current locations of the first and second terminal devices are substantially the same. When it is determined that the current locations of the first and second terminal devices are substantially the same, the processor device may control the transceiver to transmit the status information to the second terminal device to authenticate the second terminal device.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
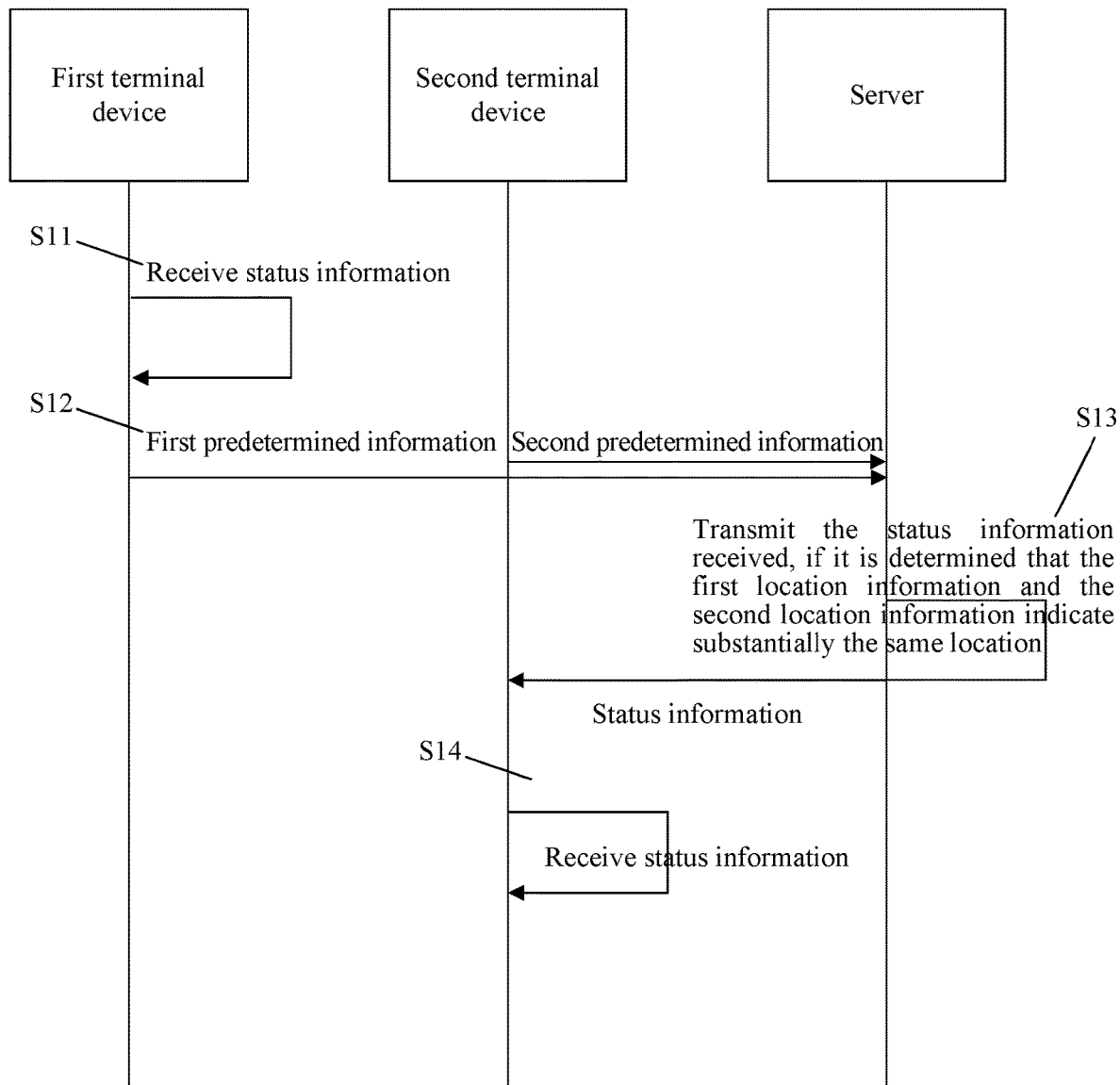
FIG. 1 is a schematic flow diagram of an exemplary terminal device interaction method, according to an embodiment of the present application.

FIG. 1 shows a flow diagram of an exemplary method 1 for a terminal device interaction method provided by an embodiment of the application. Method 1 may comprise a series of steps. Some steps may be optional.

In step S11, a first terminal device may receive status information indicating that the first terminal device is authenticated.

The first terminal device may include smart phones, smart bracelets, smart watches, smart glasses, tablet computers, laptops, or desktop computers. The first terminal device may also include other smart devices capable of running software.

In one example, when visiting websites, or running software or applications, the first terminal device can be authenticated based on account and password information. After authentication, a server may transmit the status information indicating that the first terminal device is authenticated to the first terminal device.

In some embodiments, the status information may be used for indicating the status that the first terminal device is authenticated. For example, the status information may comprise a character string formed in accordance with a predetermined rule. The status information may also comprise account and/or password information. Specifically, for example, the status information can be a session identifier, e.g., Session ID, established between the server and the first terminal device.

In step S12, the first terminal device may receive a first predetermined signal. The first terminal device may then transmit first predetermined information, the status information, and/or first location information indicating a current location of the first terminal device to a server. Similarly, a second terminal device may receive a second predetermined signal, and may transmit second predetermined information with second location information indicating a current location of the second terminal device to the server.

In one embodiment, the first predetermined signal may include a character string arranged in accordance with a predetermined rule. In another embodiment, the first predetermined signal may include a voltage input received by a predetermined port of the first terminal device.

There may be many ways of inputting the first predetermined signal to the first terminal device. For example: inputting the first predetermined signal to the first terminal device through a keyboard; inputting the first predetermined signal to the first terminal device through a virtual key of a touch screen; detecting whether a direction of motion of the first terminal device suddenly changes through an arrangement of a motion detection device, such as inputting the first predetermined signal to the first terminal device if a user shakes the first terminal device.

In some embodiments, when the first terminal device receives the input first predetermined signal, which may indicate a situation in which the first terminal device's authentication is potentially to be synchronized to another terminal device, the first terminal device may transmit the first predetermined information to the server, so that the status of the first terminal device (e.g., being authenticated) may be synchronized to another terminal device through the server.

The first location information may indicate the current location of the first terminal device. The first location information can be generated by satellite positioning. For example, the first terminal device may be provided with a Global Positioning System (GPS) module. The first location information can also be generated by base station positioning. For example, the first terminal device may be provided with a Global System for Mobile Communication (GSM) chip or a Code Division Multiple Access (CDMA) chip, etc. The first location information can also be generated by network IP positioning.

There may be many ways of arranging the first predetermined information, the status information, and the first location information. For example, the status information and the first location information may be used as part of the content of the first predetermined information. The status information may be separated from the first location information by a separator. In another example, one of the status information and the first location information may be used as part of the content of the first predetermined information. The other may be used as an attachment to the first predetermined information. In yet another example, a predetermined character string may be used as the content of the first predetermined information. Both the status information and the first location information may be used as attachment to the first predetermined information.

The second terminal device may include smart phones, smart bracelets, smart watches, smart glasses, tablet computers, laptops or desktop computers. The second terminal device may also be other smart devices capable of running software.

In one embodiment, the second predetermined signal may include a character string arranged in accordance with a predetermined rule. In another embodiment, the second predetermined signal may also include a voltage input received by a predetermined port of the second terminal device.

There may be many ways of inputting the second predetermined signal to the second terminal device. For example: inputting the second predetermined signal to the second terminal device through a keyboard; inputting the second predetermined signal to the second terminal device through a virtual key of a touch screen; detecting whether a direction of motion of the second terminal device suddenly changes through an arrangement of a motion detection device, such as inputting the second predetermined signal to the second terminal device if a user shakes the second terminal device.

In some embodiments, receiving the input second predetermined signal by the second terminal device may indicate that the status information of another authenticated terminal device needs to be obtained by the second terminal device so that authentication of the second terminal device can be completed according to the status information.

The second location information may indicate the current location of the second terminal device. The second location information can be generated by satellite positioning. For example, the second terminal device may be provided with a GPS module. The second location information can also be generated by base station positioning. For example, the second terminal device may be provided with a GSM chip or CDMA chip, etc. The second location information can also be generated by network IP positioning.

There may be many ways of arranging the second predetermined information and the second location information. For example, the second location information may be used as part of the second predetermined information content. In another example, a predetermined character string may be used as the second predetermined information content, and the second location information may be used as an attachment to the second predetermined information.

In step S13, the server may determine whether the first location information and the second location information indicate substantially the same location. If it is determined that the first location information and the second location information indicate substantially the same location, the server may transmit the status information received from the first terminal device to the second terminal device.

In some embodiments, the server may compare the locations indicated by the first and second location information. The server may communicate with a plurality of terminal devices, all of which can transmit location information to the server, but do not necessarily have to synchronize login status information to the same account. Therefore, the server may determine whether the terminal devices are at the same location based on the received location information.

In some embodiments, if it is determined that the first and second location information indicate substantially the same location, the server may confirm that the first and second terminal devices are co-located and both transmit the predetermined information, indicating that the status information of the first terminal device is to be transmitted to the second terminal device for authenticating the second terminal device. The server may then transmit the status information received from the first terminal device to the second terminal device.

In step S14, the second terminal device may receive the status information from the server. The second terminal device may then be authenticated using the received status information.

In some embodiments, after the second terminal device receives the status information, authentication and other tasks can be completed based on the received status information, without requiring a user to re-enter the account and password information to the second terminal device, thereby improving convenience to the user. The status information may include the Session ID assigned by the server to the first terminal device. The Session ID may be added to all subsequent communications with the server after the second terminal device receives the Session ID. The first terminal device, the second terminal device, and the server may be in the same session. Furthermore, the status information may include account and/or password information, so the second terminal device can further access data corresponding to the access level of the account. Moreover, a corresponding relationship may exist between the Session ID and the account, and the second terminal device may also access data corresponding to the access level of the account based on the Session ID.

According to the above described method, a first terminal device may be authenticated first. The first terminal device and a second terminal device to be authenticated may transmit predetermined information to a server. The server may then transmit status information of the authenticated terminal device to the second terminal device to be authenticated. Authentication of the second terminal device may be completed according to the status information. This method may avoid re-entering the account and password and improve convenience to the user.

The first terminal device may comprise a motion detection device for generating a first predetermined signal when the direction of motion of the first terminal device suddenly changes. The second terminal device may comprise a keyboard for generating a second predetermined signal when a predetermined key of the keyboard is pressed. The first and second predetermined signals may be generated at substantially the same time when, for example, a user uses the first terminal device to press or click the predetermined key of the second terminal device.

When the predetermined key of the keyboard of the second terminal device is pressed by the first terminal device, the direction of motion of the first terminal device may suddenly change during the pressing process, and the motion detection device can generate the first predetermined signal based on the change in the direction of motion. Therefore, the operation of inputting the first predetermined signal to the first terminal device can be achieved. Similarly, when the predetermined key of the second terminal device is pressed by the first terminal device, the predetermined key may generate the second predetermined signal, e.g., the operation of inputting the second predetermined signal to the second terminal device can be achieved.

Figure 2:
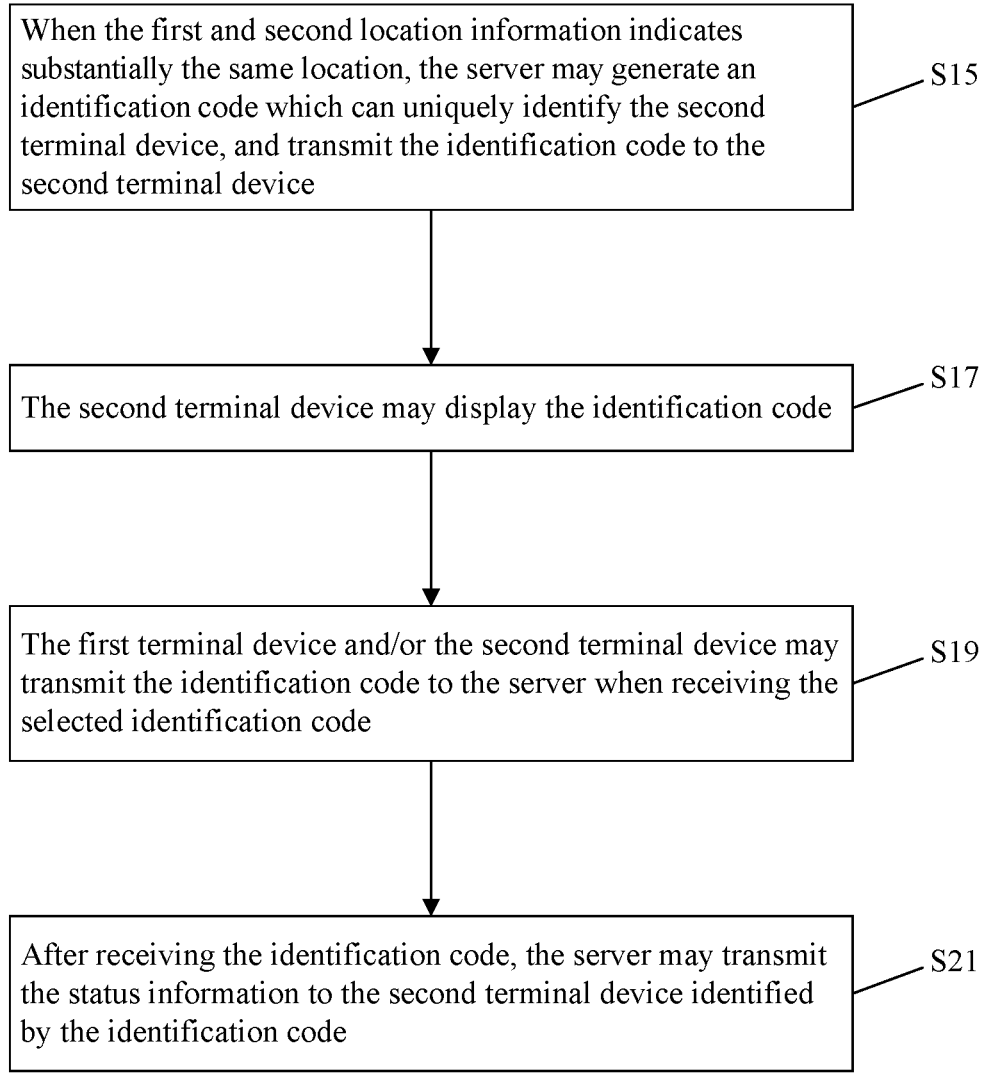
FIG. 2 is a flow diagram of an exemplary terminal device interaction method, according to an embodiment of the present application.

FIG. 2 shows an exemplary method of authenticating a terminal device, which may comprise the following steps:

Step S15: The server may compare the first and second location information to determine whether they indicate substantially the same location. When the first location information and the second location information indicate substantially the same location, the server may generate an identification code which can uniquely identify the second terminal device and to indicate the identity of the terminal device, and transmit the identification code to the second terminal device.

In some embodiments, the server may communicate with a plurality of second terminal devices, the plurality of second terminal devices and the first terminal device may be co-located in the same of substantially the same location, and the user may wish to authenticate one of the plurality of second terminal devices by transmitting the status information of the first terminal device to that second terminal device. Moreover, the second terminal devices may all transmit the predetermined information to the server. So the server may need to distinguish at which second terminal device in particular the user wishes to obtain the status information. To prevent the server from transmitting the status information to second terminal devices that should not receive the status information, the server may assign an identification code to each of the plurality of second terminal device, so that the second terminal devices can be distinguished by the identification codes.

In some embodiments, the identification codes can be generated by the server according to a predetermined algorithm. For example, the predetermined algorithm can include a random function, a hash algorithm, etc.

Step S17: The second terminal device may display the identification code.

In some embodiments, the second terminal device may display the identification code, so that the user can select, confirm, and/or designate the second terminal device to obtain the status information according to the identification code displayed by the second terminal device. When there are a plurality of second terminal devices, the identification code corresponding to each of the plurality of second terminal devices can be displayed.

Step S19: When receiving the selected identification code, the first terminal device and/or the second terminal device may transmit the selected identification code to the server.

In some embodiments, after the corresponding identification code is displayed by the second terminal device, the user can enter the corresponding identification code of the second terminal device that needs to obtain the status information to the first terminal device, so that the first terminal device can feed the identification code back to the server and the sever can identify the second terminal device that needs to receive the status information. The user can also enter the corresponding identification code of the second terminal device that needs to obtain the status information to the second terminal device, and the second terminal device transmits the identification code to the server, so that the server can identify the second terminal device that needs to receive the status information. Moreover, the user can also enter the corresponding identification code of the second terminal device that needs to obtain the status information to both the first and second terminal devices, and the first and second terminal devices each feed the identification code back to the server.

In some embodiments, after receiving the identification code, the first terminal device or the second terminal device may transmit the identification code to the server for further processing.

Step S21: after receiving the identification code, the server may transmit the status information to the second terminal device identified by the identification code.

In some embodiments, after receiving the identification code transmitted by the first terminal device, the server can identify the second terminal device that needs to receive the status information based on the identification code, and transmit the status information to the second terminal device.

Figure 3:
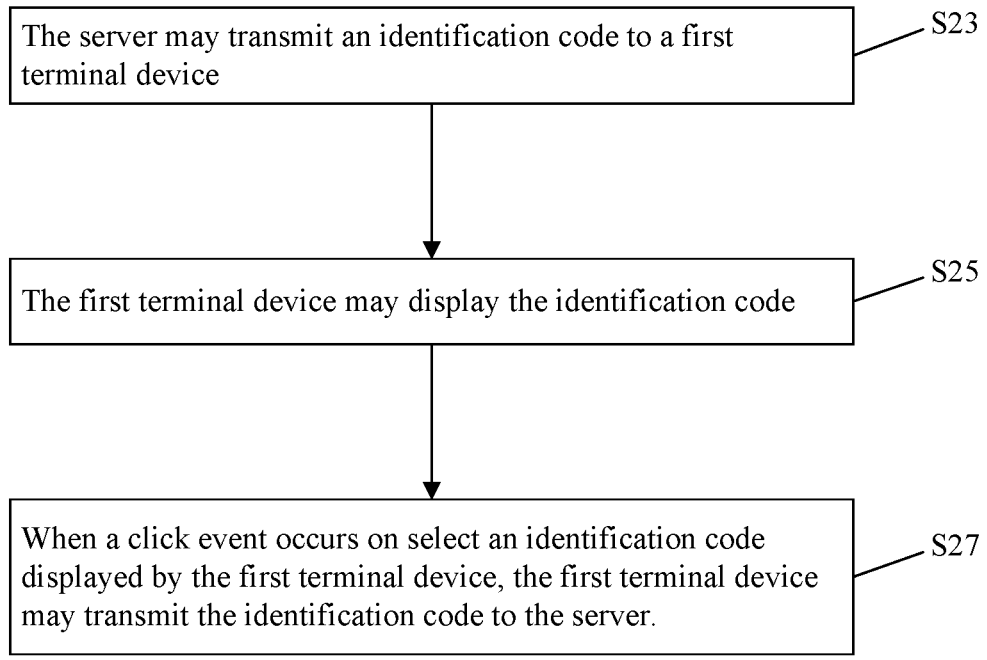
FIG. 3 is a flow diagram of another exemplary terminal device interaction method, according to an embodiment of the present application.

FIG. 3 shows another exemplary terminal device interaction method, which may also comprise the following steps.

Step S23: the server may transmit the identification code to the first terminal device.

In some embodiments, the server may transmit the identification code to the first terminal device after generating the identification code.

Step S25: the first terminal device may display the identification code.

In some embodiments, the first terminal device may display the identification code, so that the user can distinguish among different second terminal devices according to the identification codes displayed on the first terminal device. When there are a plurality of second terminal devices, the first terminal device can display an identification code list, and each second terminal device may display the corresponding identification code, so the user can see the identification code displayed on a certain second terminal device, and correspondingly look up the same identification code from the list displayed by the first terminal device.

Step S27: when a click event occurs to select an identification code displayed by the first terminal device, the first terminal device may transmit the identification code to the server.

In some embodiments, the user can identify the second terminal device that needs to obtain the status information by clicking on the corresponding identification code displayed by the first terminal device to select that second terminal device.

In some embodiments, the first terminal device can monitor whether a click event occurs to the displayed identification code. For example, the first terminal device may be provided with a touch screen, and the user can click on a position on the touch screen corresponding to the identification code, or click on the identification code using a mouse device.

Figure 4:
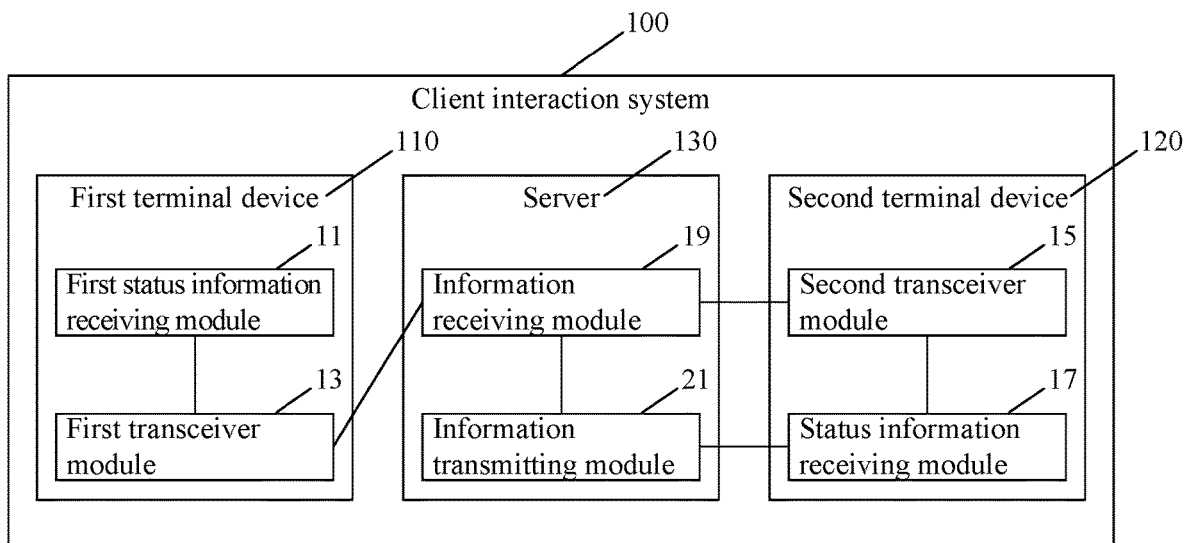
FIG. 4 is a functional block diagram of an exemplary terminal device interaction system, according to an embodiment of the present application.

FIG. 4 shows an exemplary implementation of a terminal device interaction system 100, which may comprise a first terminal device 110, a second terminal device 120 and a server 130.

The first terminal device 110 may comprise a first status information receiving module 11 and a first transceiver module 13. As used herein, a module may be implemented by a processor device of a terminal device or a server. For example, the processor device may execute software instructions stored on a memory device to perform the functions prescribed by the module.

In some embodiments, the first terminal device may include smart phones, smart bracelets, smart watches, smart glasses, tablet computers, laptops, or desktop computers. The first terminal device may also include other smart devices capable of running software.

The first status information receiving module 11 may be used for receiving status information indicating that the first terminal device is authenticated.

In one example, when visiting websites, or running software or applications, the first terminal device 110 can be authenticated based on account and password information. After authentication, the server may transmit the status information indicating that the first terminal device 110 is authenticated to the first terminal device 110, and the first status information receiving module 11 may be used for receiving the status information.

In some embodiments, the status information may be used for indicating that the first terminal device 110 is authenticated. For example, the status information may comprise a character string formed in accordance with a predetermined rule. The status information may also comprise account and/or password information. Specifically, for example, the status information may be a session identifier, e.g., Session ID, established between the server and the first terminal device 110.

The first transceiver module 13 may receive a first predetermined signal, and may be used for transmitting first predetermined information with the status information and first location information indicating a current location to the server 130.

In some embodiments, the first predetermined signal may include a character string arranged in accordance with a predetermined rule. In another embodiment, the first predetermined signal may include a voltage input received by a predetermined port of the first terminal device 110.

There may be many ways of inputting the first predetermined signal to the first transceiver module 13. For example: inputting the first predetermined signal through a keyboard; inputting the first predetermined signal through a virtual key of a touch screen; detecting whether a direction of motion of the first terminal device 110 suddenly changes through an arrangement of a motion detection device, such as inputting the first predetermined signal when a user shakes the first terminal device 110.

In some embodiments, if the first transceiver module 13 receives the input first predetermined signal, which may indicate a situation in which the first terminal device's authentication is potentially to be synchronized to another terminal device, the first transceiver module 13 may transmit the first predetermined information to the server 130, so that the status information of the first terminal device 110 may be synchronized to another terminal device (e.g., second terminal device 120) through the server 130.

The first location information may indicate the current location of the first terminal device 110. The first location information can be generated by satellite positioning. For example, the first terminal device 110 may be provided with a GPS module. The first location information can also be generated by base station positioning. For example, the first terminal device 110 may be provided with a GSM chip or CDMA chip, etc. The first location information can also be generated by network IP positioning.

There may be many ways of arranging the first predetermined information, the status information, and the first location information. For example: the status information and the first location information may be used as part of the content of the first predetermined information. The status information may be separated from the first location information by a separator. In another example, one of the status information and the first location information may be used as part of the content of the first predetermined information. The other may be used as an attachment to the first predetermined information. In yet another example, a predetermined character string may be used as the content of the first predetermined information. Both the status information and the first location information may be used as attachment to the first predetermined information.

The second terminal device 120 may comprise a second transceiver module 15 and a status information receiving module 17.

In some embodiments, the second terminal device 120 may include smart phones, smart bracelets, smart watches, smart glasses, tablet computers, laptops or desktop computers. The second terminal device may also include other smart devices capable of running software.

The second transceiver module 15 may receive a second predetermined signal, and may be used for transmitting second predetermined information with second location information indicating a current location of the second terminal device to the server 130.

In one embodiment, the second predetermined signal may include a character string arranged in accordance with a predetermined rule. In another embodiment, the second predetermined signal may include a voltage input received by a predetermined port of the second terminal device.

There may be many ways of inputting the second predetermined signal to the second transceiver module 15. For example: inputting the second predetermined signal through a keyboard; inputting the second predetermined signal through a virtual key of a touch screen; detecting whether the motion direction of the second terminal device 120 suddenly changes through the arrangement of a motion detection device, such as inputting the second predetermined signal when a user shakes the second terminal device 120.

In some embodiments, receiving the input second predetermined signal by the second terminal device 120 may indicate that the status information of another authenticated terminal device needs to be obtained by the second terminal device so that authentication of the second terminal device 120 can be achieved according to the status information.

The second location information may indicate the current location of the second terminal device 120. The second location information can be generated by satellite positioning. For example, the second terminal device 120 may be provided with a GPS module. The second location information can also be generated by base station positioning. For example, the second terminal device 120 may be provided with a GSM chip or CDMA chip, etc. The second location information can also be generated by network IP positioning.

There may be many ways of arranging the second predetermined information and the second location information. For example, the second location information may be used as part or all of the second predetermined information content. In another example, a predetermined character string may be used as the second predetermined information content, and the second location information may be used as an attachment to the second predetermined information.

The status information receiving module 17 may be used for receiving the status information.

In some embodiments, after the status information receiving module 17 receives the status information, authentication of the second terminal device 120 and other tasks can be completed based on the received status information, without requiring a user to re-enter the account and password information to the second terminal device, thereby improving convenience to the user. The status information may include a Session ID assigned by server 130 to the first terminal device. The Session ID may be added to all subsequent communications with server 130 after the second terminal device 120 receives the Session ID. The first terminal device 110, the second terminal device 120, and the server 130 can be in the same session. Furthermore, the status information may include account and/or password information, so the second terminal device 120 can further access data corresponding to the access level of the corresponding account. Moreover, a corresponding relationship may exist between the Session ID and the account, and the second terminal device 120 may also access data corresponding to the access level of account based on the Session ID.

The server 130 may comprise an information receiving module 19 and an information transmitting module 21.

The information receiving module 19 may be used for receiving the first and second predetermined information.

In some embodiments, the information receiving module 19 may include essential data communication hardware and/or essential software drivers for the hardware.

The information transmitting module 21 may be used for transmitting the status information to the second terminal device 120 when the first and second location information indicates the same location.

In some embodiments, the server 130 may compare the locations indicated by the first and second location information. The server 130 may communicate with a plurality of terminal devices, all of which can transmit location information to the server 130, but do not necessarily have to synchronize the login information to the same account. Therefore, the server 130 may determine whether the terminal devices are in the same location based on the received location information.

In some embodiments, when determining that the first and second location information indicate substantially the same location, the server 130 may confirm that the first terminal device 110 and the second terminal device 120 are co-located and both transmit the predetermined information, indicating that the status information of the first terminal device 110 is to be transmitted to the second terminal device 120 for authenticating the second terminal device 120. The server 130 may then transmit the status information received from the first terminal device to the second terminal device 120.

Figure 5:
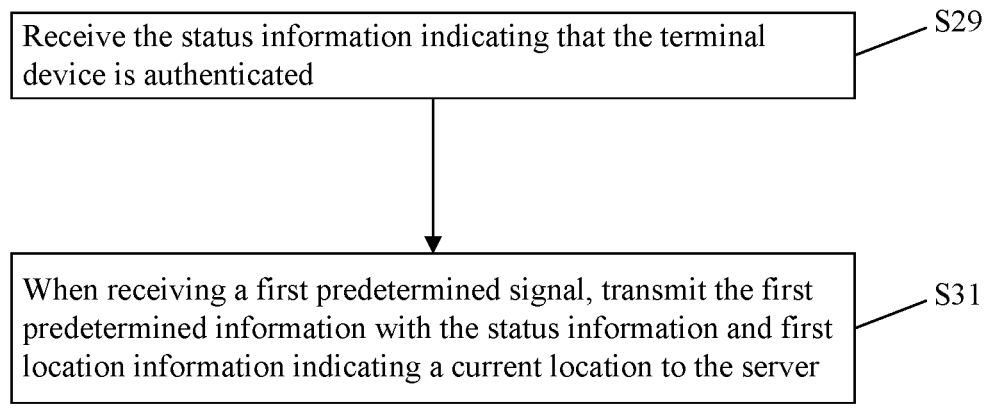
FIG. 5 is a flow diagram of an exemplary terminal device interaction method, according to an embodiment of the present application.

FIG. 5 shows an exemplary terminal device interaction method implemented by first terminal device 110, which may comprise the following steps.

Step S29: status information indicating that a terminal device is authenticated is received.

In one example, when visiting websites, or running software or applications, the terminal device can be authenticated based on account and password information. After authentication, the server may receive the account and password information and may transmit the status information indicating that the terminal device is authenticated to the terminal device.

In some embodiments, the status information may be used for indicating that the terminal device is authenticated. For example, the status information may comprise a character string formed in accordance with a predetermined rule. The status information may also comprise account and/or password information. Specifically, for example, the status information can be a session identifier, e.g., Session ID, established between the server and the terminal device.

Step S31: the terminal device may receive a first predetermined signal, the terminal device may then transmit first predetermined information with the status information and first location information indicating a current location of the terminal device to a server.

In one embodiment, the first predetermined signal may include a character string arranged in accordance with a predetermined rule. In another embodiment, the first predetermined signal may include a voltage input received by a predetermined port of the terminal device.

There may be many ways of inputting the first predetermined signal to the terminal device. For example: inputting the first predetermined signal to the terminal device through a keyboard; inputting the first predetermined signal to the terminal device through a virtual key of a touch screen; detecting whether a direction of motion of the terminal device suddenly changes through an arrangement of a motion detection device, such as inputting the first predetermined signal if a user shakes the terminal device.

In some embodiments, if the terminal device receives the input first predetermined signal, which may indicate a situation in which the terminal device's authentication is potentially to be synchronized to another terminal device, the terminal device may transmit the first predetermined information to the server, so that the status information of the terminal device may be synchronized to another terminal device through the server.

The first location information may indicate the current location of the terminal device. The first location information can be generated by satellite positioning. For example, the terminal device may be provided with a GPS module. The first location information can also be generated by base station positioning. For example, the terminal device may be provided with a GSM chip or CDMA chip, etc. The first location information can also be generated by network IP positioning.

There may be many ways of arranging the first predetermined information, the status information, and the first location information. For example: the status information and the first location information may be used as part of the content of the first predetermined information. The status information may be separated from the first location information by a separator. In another example, one of the status information and the first location information may be used as part of the content of the first predetermined information. The other may be used as an attachment to the first predetermined information. In yet another example, a predetermined character string may be used as the content of the first predetermined information. Both the status information and the first location information may be used as attachment to the first predetermined information.

In one embodiment of the application, receiving the first predetermined signal may comprise: generating the first predetermined signal when detecting a sudden change in the direction of motion.

In some embodiments, the terminal device may comprise a motion detection device for generating a first predetermined signal when the direction of motion of the terminal device suddenly changes, thereby inputting the first predetermined signal to the terminal device. For example, the motion detection device may be a gyroscope.

In one embodiment of the application, receiving the first predetermined signal may comprise: generating the first predetermined signal by pressing a predetermined key.

In some embodiments, the terminal device may comprise a keyboard or a virtual keyboard with touch screen technologies. The first predetermined signal may be an electric signal generated by pressing the predetermined key, for example, the space key, of the keyboard or virtual keyboard.

Figure 6:
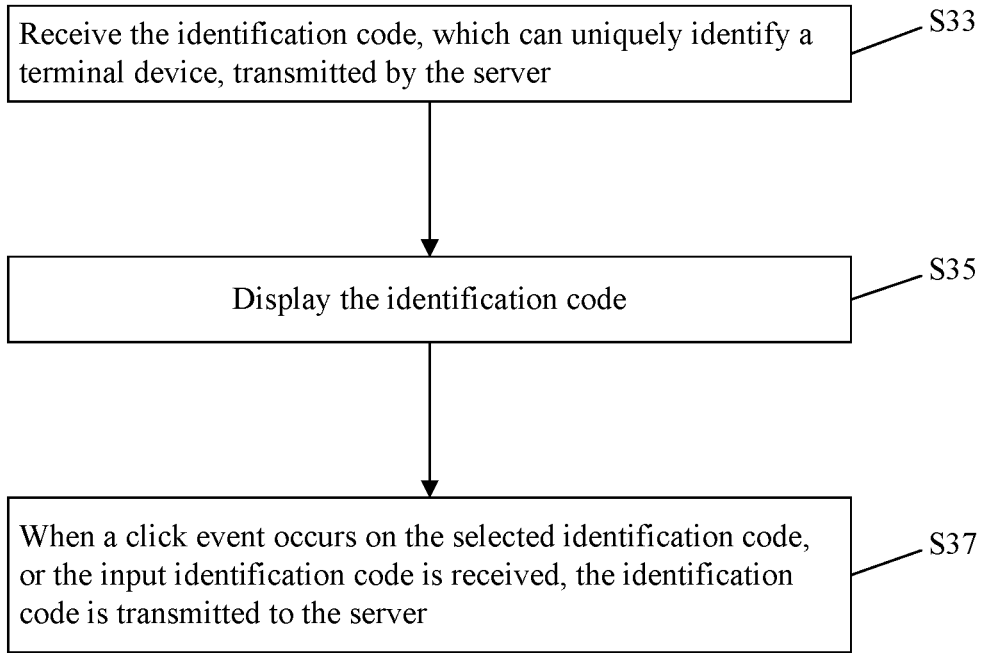
FIG. 6 is a flow diagram of another exemplary terminal device interaction method, according to an embodiment of the present application.

FIG. 6 shows another exemplary terminal device interaction method, which may comprise the followings steps.

Step S33: an identification code transmitted by the server may be received, and the identification code can uniquely identify one terminal device.

In some embodiments, the server may communicate with a plurality of terminal devices, one of which has been authenticated, and the user may wish to authenticate another one of the plurality of terminal devices by transmitting the status information of the authenticated terminal device to the other terminal device. Moreover, the terminal devices may all transmit the predetermined information to the server. So the server may need to distinguish at which terminal device in particular the user wishes to obtain the status information. To prevent the server from transmitting the status information to the terminal device that should not receive the status information, the server may assign an identification code to each of the plurality of terminal device, so the terminal devices can be distinguished by the identification codes.

Step S35: the identification codes may be displayed.

In some embodiments, the terminal devices may display the identification codes, so that the user can distinguish among different terminal devices according to the identification codes displayed by the terminal devices. When there is a plurality of terminal devices, the authenticated terminal device can display an identification code list, and each unauthenticated terminal device displays the corresponding identification code, so the user can see the identification code displayed on a certain terminal device, and correspondingly look up the same identification code from the list displayed by the authenticated terminal device.

Step S37: when a click event occurs to select an identification code or an entered identification code is received, the identification code may be transmitted to the server.

In some embodiments, the user may click on the displayed identification code on the authenticated terminal device or enter the identification code, so as to confirm the terminal device to obtain the status information based on the corresponding relationship between the identification code and the terminal device.

In some embodiments, the terminal device can monitor whether the click event occurs on the displayed identification code. For example, the terminal device may be provided with a touch screen, and the user can click on the position on the touch screen corresponding identification code, or click on the identification code using a mouse device. When the terminal device provides a keyboard, the user may enter the identification code.

In some embodiments, the terminal device may transmit the identification code to the server, so that the server can transmit the status information to the terminal device corresponding to the identification code.

Figure 7:
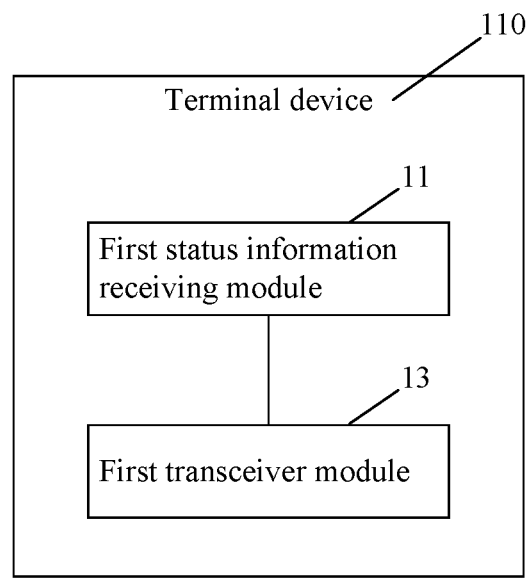
FIG. 7 is a functional block diagram of an exemplary terminal device, according to an embodiment of the present application.

FIG. 7 shows an exemplary implementation of terminal device 110, which may comprise a first status information receiving module 11 and a first transceiver module 13.

In some embodiments, the terminal device may include smart phones, smart bracelets, smart watches, smart glasses, tablet computers, laptops or desktop computers. The terminal device may also include other smart devices capable of running software.

The first status information receiving module 11 may be used for receiving status information indicating that the terminal device is authenticated.

In one example, when visiting websites, or running software or applications, the terminal device 110 can be authenticated based on account and password information. After authentication, the server may transmit the status information indicating that the terminal device 110 is authenticated to the terminal device 110. The first status information receiving module 11 may be used for receiving the status information.

In some embodiments, the status information may be used for indicating that the terminal device 110 is authenticated. For example, the status information may comprise a character string formed in accordance with a predetermined rule. The status information may also comprise account and/or password information. Specifically, for example, the status information can be a session identifier, e.g., Session ID, established between the server and the terminal device 110.

The first transceiver module 13 may receive a first predetermined signal, and the first transceiver module 13 may then be used for transmitting first predetermined information with the status information and first location information indicating a current location to the server.

In one embodiment, the first predetermined signal may include a character string arranged in accordance with a predetermined rule. In another embodiment, the first predetermined signal may include a voltage input received by a predetermined port of the terminal device 110.

There may be many ways of inputting the first predetermined signal to the first transceiver module 13. For example: inputting the first predetermined signal through a keyboard; inputting the first predetermined signal through a virtual key of a touch screen; detecting whether a direction of motion of the terminal device 110 suddenly changes through an arrangement of a motion detection device, such as inputting the first predetermined signal if a user shakes the terminal device 110.

In some embodiments, receiving the input first predetermined signal by the first transceiver module 13 may indicate that the status information of the first terminal device need to be transmitted to another terminal device, so that the authentication of the other terminal device can be completed according to the status information. The first transceiver module 13 may transmit the first predetermined information to the server, so that the server may transmit the status information of the first terminal device to another terminal device.

The first location information may indicate the current location of the terminal device 110. The first location information can be generated by satellite positioning. For example, the terminal device 110 may be provided with a GPS module. The first location information can also be generated by base station positioning. For example, the terminal device 110 may be provided with a GSM chip or CDMA chip, etc. The first location information can also be generated by network IP positioning.

There may be many ways of arranging the first predetermined information, the status information, and the first location information. For example: the status information and the first location information may be used as part of the content of the first predetermined information. The status information may be separated from the first location information by a separator. In another example, one of the status information and the first location information may be used as part of the content of the first predetermined information. The other may be used as an attachment to the first predetermined information. In yet another example, a predetermined character string may be used as the content of the first predetermined information. Both the status information and the first location information may be used as attachment to the first predetermined information.

Figure 8:
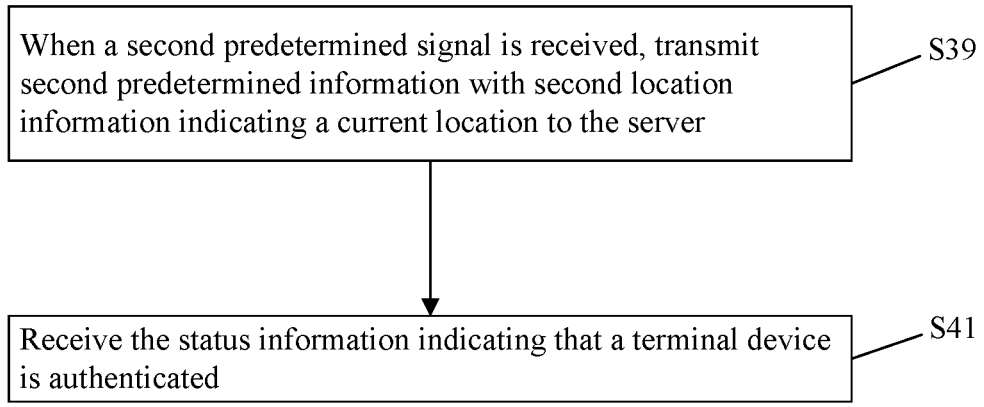
FIG. 8 is a flow diagram of an exemplary terminal device interaction method, according to an embodiment of the present application.

FIG. 8 shows an exemplary terminal device interaction method implemented by second terminal device 120, which may comprise the following steps.

Step S39: when a second predetermined signal is received, second predetermined information with second location information indicating a current location may be transmitted to a server.

In one embodiment, the second predetermined signal may include a character string arranged in accordance with a predetermined rule. In another embodiment, the second predetermined signal may include a voltage input received by a predetermined port of a terminal device.

There may be many ways of inputting the second predetermined signal to the terminal device. For example: inputting the second predetermined signal to the terminal device through a keyboard; inputting the second predetermined signal to the terminal device through a virtual key of a touch screen; detecting whether a direction of motion of the terminal device suddenly changes through an arrangement of a motion detection device, such as inputting the second predetermined signal to the terminal device if a user shakes the terminal device.

In some embodiments, receiving the input second predetermined signal by the second terminal device may indicate that the status information of another authenticated terminal device needs to be obtained by the second terminal device so that authentication of the second terminal device can be completed according to the status information.

The second location information may indicate the current location of the terminal device. The second location information can be generated by satellite positioning. For example, the terminal device may be provided with a GPS module. The second location information can also be generated by base station positioning. For example, the terminal device may be provided with a GSM chip or CDMA chip, etc. The second location information can also by generated by network IP positioning.

There may be many ways of arranging the second predetermined information and the second location information. For example, the second location information may be used as part or all of the second predetermined information content. In another example, a predetermined character string may be used as the second predetermined information content, and the second location information may be used as an attachment to the second predetermined information.

Step S41: the status information indicating that the terminal device is authenticated may be received.

In some embodiments, the status information may be used for indicating the status that a terminal device is authenticated. For example, the status information can comprise a character string formed in accordance with a predetermined rule. The status information may also comprise account and/or password information. Specifically, for example, the status information can be a session identifier, e.g., Session ID, established between the server and the terminal device.

In some embodiments, after the terminal device receives the status information, the authentication can be completed based on the received status information, without requiring a user to re-enter the account and password information to the terminal device, thereby improving convenience to the user. The status information may include the Session ID assigned by the server to the authenticated terminal device. The Session ID may be added to all subsequent communications with the server after the current terminal device receives the Session ID. The terminal device transmitting the status information, the current terminal device, and the server may be in the same session. Furthermore, the status information may include account and/or password information, so the terminal device can further access data corresponding to the access level of corresponding account. Moreover, a corresponding relationship may exist between the Session ID and the account, and the terminal device may also access data corresponding to the access level of the account based on the Session ID.

In one embodiment of the application, receiving the second predetermined signal may comprise: generating the second predetermined signal when detecting a sudden change in the direction of motion.

In some embodiments, the terminal device may comprise a motion detection device for generating a second predetermined signal when the direction of motion of the terminal device suddenly changes, thereby inputting the second predetermined signal to the terminal device. For example, the motion detection device may be a gyroscope.

In one embodiment of the application, receiving the input second predetermined signal may comprise: generating the second predetermined signal by clicking a predetermined key.

In some embodiments, the terminal device may comprise a keyboard or a virtual keyboard with touch screen technologies. The second predetermined signal may be an electric signal generated by pressing the predetermined key, for example, the space key, of the keyboard or virtual keyboard.

Figure 9:
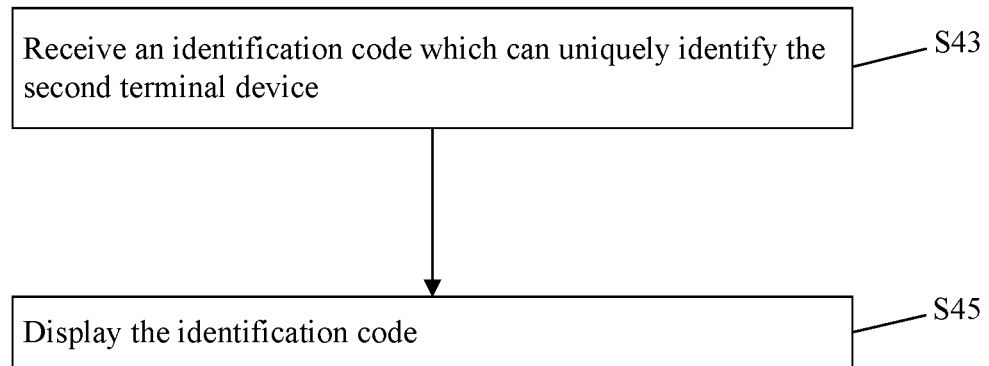
FIG. 9 is a flow diagram of an exemplary terminal device interaction method, according to an embodiment of the present application.

FIG. 9 shows another exemplary terminal device interaction method, which may comprise the following steps.

Step S43: an identification code transmitted by the server may be received, and the identification code can uniquely identify the second terminal device.

The server may communicate with a plurality of terminal devices in the same location, one of which is authenticated, and the user may wish to authenticate one of the plurality of terminal devices by transmitting the status information of the authenticated terminal device to the other terminal device. Moreover, the terminal devices may all transmit the predetermined information to the server. So the server may need to distinguish at which terminal device in particular the user wishes to obtain the status information. To prevent the server from transmitting the status information to terminal devices that should not receive the status information, the server may assign an identification code to each of the plurality of terminal device, so that the terminal devices can be distinguished by the identification codes.

Step S45: the identification codes may be displayed.

In some embodiments, the terminal device may display the identification code, so that the user can select, confirm, and/or designate the terminal device to obtain the status information according to the identification code displayed by the terminal device. When there is a plurality of terminal devices, the identification code corresponding to each of the plurality of terminal devices can be displayed.

Figure 10:
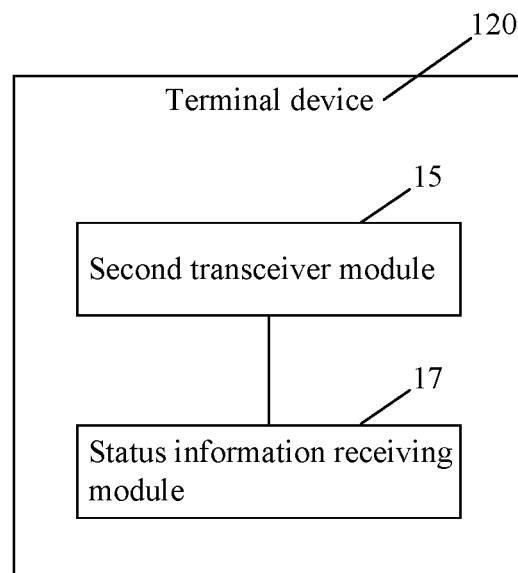
FIG. 10 is a functional block diagram of an exemplary terminal device, according to an embodiment of the present application.

FIG. 10 shows an exemplary implementation of terminal device 120, which may comprise a second transceiver module 15 and a status information receiving module 17.

In some embodiments, the terminal device 120 may include smart phones, smart bracelets, smart watches, smart glasses, tablet computers, laptops or desktop computers. The terminal device may also include other smart devices capable of running software.

The second transceiver module 15 may be used for transmitting second predetermined information to the server when receiving a second predetermined signal with second location information indicating a current location.

In one embodiment, the second predetermined signal may include a character string arranged in accordance with a predetermined rule. In another embodiment, the second predetermined signal may include a voltage input received by a predetermined port of the terminal device.

There may be many ways of inputting the second predetermined signal to the second transceiver module 15. For example: inputting the second predetermined signal through a keyboard; inputting the second predetermined signal through a virtual key of a touch screen; detecting whether a direction of motion of the terminal device 120 suddenly changes through an arrangement of a motion detection device, such as inputting the second predetermined signal if the user shakes the terminal device.

In some embodiments, receiving the input second predetermined signal by the second terminal device 120 may indicate that the status information of another authenticated terminal device needs to be obtained by the second terminal device so that authentication of the second terminal device 120 can be completed according to the status information.

The second location information may indicate the current location of the terminal device 120. The second location information can be generated by satellite positioning. For example, the terminal device 120 may be provided with a GPS module. The second location information can also be generated by base station positioning. For example, the terminal device 120 may be provided with a GSM chip or CDMA chip, etc. The second location information can also be generated by network IP positioning.

There may be many ways of arranging the second predetermined information and the second location information. For example, the second location information may be used as part or all of the second predetermined information content. In another example, a predetermined character string may be used as the second predetermined information content, and the second location information may be used as an attachment to the second predetermined information.

The status information receiving module 17 may be used for receiving the status information.

In some embodiments, the status information may be used for indicating the status that a terminal device is authenticated. For example, the status information may comprise a character string formed in accordance with a predetermined rule. The status information may also comprise account and/or password information. Specifically, for example, the status information can be a session identifier, e.g., Session ID, established between the server and the terminal device.

In some embodiments, after the status information receiving module 17 receives the status information, authentication of the terminal device 120 can be completed based on the received status information, without requiring a user to re-enter the account and password information, thereby improving convenience to the user. The status information may include the Session ID assigned by the server to the authenticated terminal device. The Session ID may be added to all the subsequent communications with the server after the current terminal device 120 receives the Session ID. The terminal device transmitting the status information, the current terminal device 120, and the server can be in the same session. Furthermore, the status information may include account and/or password information, so the terminal device 120 can further access data corresponding to the access level of the account. Moreover, a corresponding relationship may exist between the Session ID and the account, and the second terminal device 120 may also access data corresponding to the access level of the account based on the Session ID.

Figure 11:
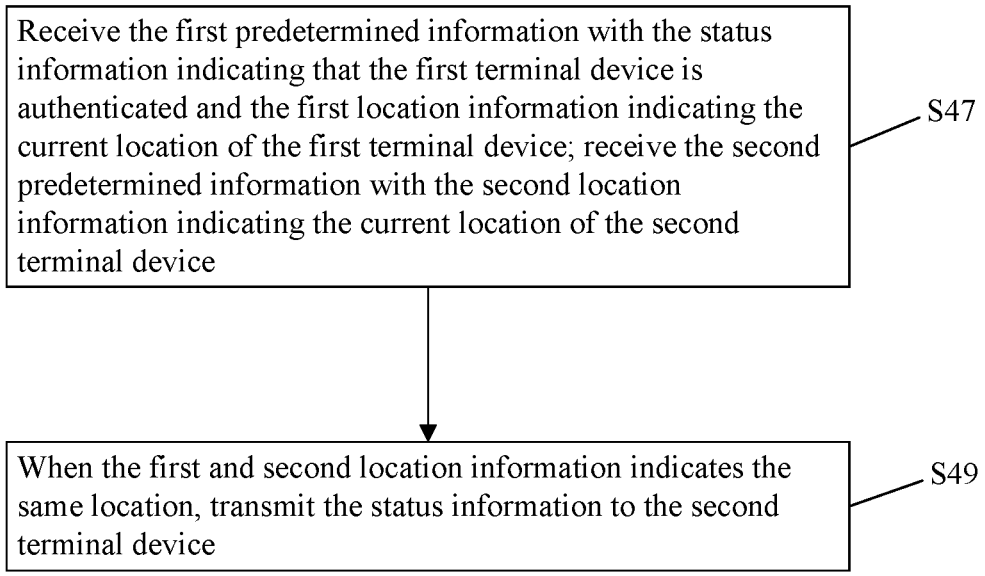
FIG. 11 is a flow diagram of an exemplary terminal device interaction method, according to an embodiment of the present application.

FIG. 11 shows another exemplary terminal device interaction method, which may comprise the following steps.

Step S47: first predetermined information with status information indicating that a first terminal device is authenticated and first location information indicating a current location of the first terminal device may be received; second predetermined information with second location information indicating a current location of a second terminal device may be received.

In some embodiments, the status information may be used for indicating that the first terminal device is authenticated. For example, the status information may comprise a character string formed in accordance with a predetermined rule. The status information may also comprise account and/or password information. Specifically, for example, the status information can be a session identifier, e.g., Session ID, established between the server and the first terminal device.

In some embodiments, receiving the first predetermined information by the server may indicate that the status information of the first terminal device needs to be obtained by the second terminal device, so that authentication of the second terminal device is completed according to the status information. There may be many ways of arranging the status information and the first location information. For example, the status information and the first location information may be used as part of content of the first predetermined information. The status information may be separated from the first location information by a separator. In another example, one of the status information and the first location information may be used as part of the content of the first predetermined information. The other may be used as an attachment to the first predetermined information. In yet another example, both the status information and the first location information may be used as attachments to the first predetermined information. In yet another example, a predetermined character string may be used as the content of the first predetermined information.

The first location information may indicate the location of the first terminal device. The first location information can be generated by satellite positioning. For example, the first terminal device may be provided with a GPS module. The first location information can also be generated by base station positioning. For example, the first terminal device may be provided with a GSM chip or CDMA chip, etc. The first location information can also be generated by network IP positioning.

In some embodiments, receiving the second predetermined information by the server may indicate that the status information of the first terminal device needs to be obtained by the second terminal device. There may be many ways of arranging the second predetermined information and the second location information. For example, the second location information may be used as the content of the second predetermined information. In another example, the second location information may be used as an attachment to the second predetermined information. In yet another example, a predetermined character string may be used as the content of the second predetermined information.

The second location information may indicate the current location of the second terminal device. The second location information can be generated by satellite positioning. For example, the second terminal device may be provided with a GPS module. The second location information can also be generated by base station positioning. For example, the second terminal device may be provided with a GSM chip or CDMA chip, etc. The second location information can also by generated by network IP positioning.

Step S49: when the first location information and the second location information indicate the same location, the status information may be transmitted to the second terminal device.

In some embodiments, the server may compare the locations indicated by the first and second location information. The server may communicate with a plurality of terminal devices, all of which can transmit location information to the server, but do not necessarily have to obtain the status information of the same terminal device. Therefore, the server may determine whether the terminal devices are in the same location according to the received location information.

In some embodiments, if it is determined that the first and second location information indicate substantially the same location, the server may confirm that the first and second terminal devices are co-located and both transmit predetermined information, indicating that the status information of the first terminal device is to be transmitted to the second terminal device for authenticating the second terminal device. The server may then transmit the status information received from the first terminal device to the second terminal device.

In one embodiment of the application, the first predetermined information may be provided with a first time stamp. The second predetermined information may be provided with a second time stamp. In the step S49, when the first and second location information indicates the same location and the difference between the first and second time stamps is within a predetermined range, the server may transmit the status information to the second terminal device.

In one example, the first time stamp of the first predetermined information may be the time for the first terminal device to start transmitting the first predetermined information. In another example, the first time stamp of the first predetermined information may be the time when the first terminal device finishes transmitting the first predetermined information. In yet another example, the first time stamp of the first predetermined information may be the time for the server to start receiving the first predetermined information. In yet another example, the first time stamp of the first predetermined information may be the time when the server finishes receiving the first predetermined information.

In one example, the second time stamp of the second predetermined information may be the time for the second terminal device to start transmitting the second predetermined information. In another example, the second time stamp of the second predetermined information may be the time when the second terminal device finishes transmitting the second predetermined information. In yet another example, the second time stamp of the second predetermined information may be the time for the server to start receiving the second predetermined information. In yet another example, the second time stamp of the second predetermined information may be the completion time when the server finishes receiving the second predetermined information.

In some embodiments, the server may identify the second terminal device that needs to obtain the status information based on whether the first and second location information are in the same location and whether the difference between the first and second time stamps is within a predetermined range. In some cases, there may be a plurality of second terminal devices. The second terminal devices and the first terminal device may be in the same location. The server may more accurately identify the second terminal device that needs to obtain the status information based on whether the difference between the time of receiving the first predetermined information and the time of receiving the second predetermined information is within a predetermined range.

In some embodiments, the predetermined range may be set in the server in advance. For example, the predetermined range may be 0 to 50 micro-seconds.

Figure 12:
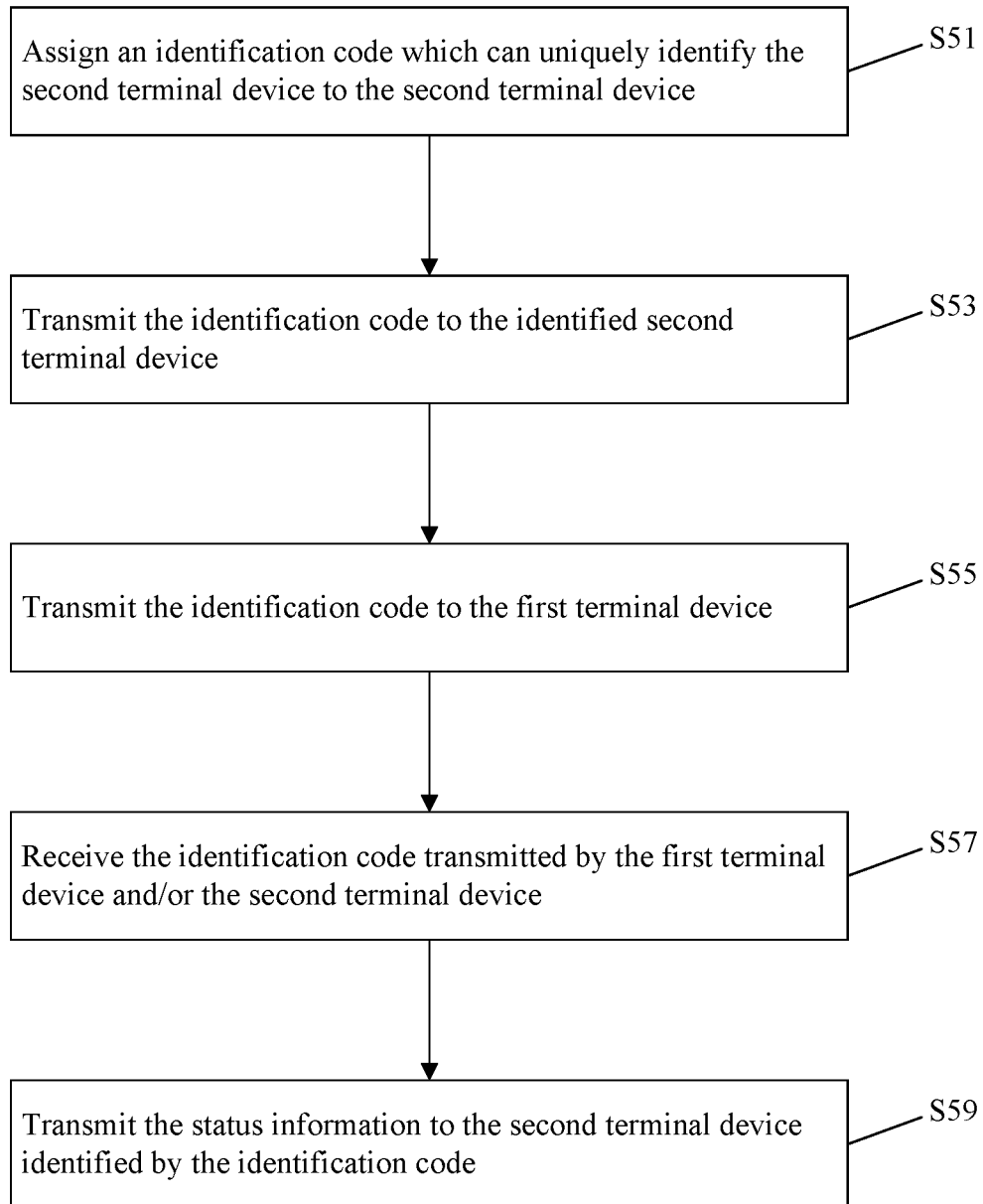
FIG. 12 is a flow diagram of an exemplary terminal device interaction method, according to an embodiment of the present application.

FIG. 12 shows an exemplary implementation of step S49 of transmitting the status information to the second terminal device, which may comprise the following steps.

Step S51: an identification code may be assigned to the second terminal device, and the identification code can uniquely identify one second terminal device.

In some embodiments, the server may communicate with a plurality of second terminal devices, the plurality of second terminal devices and the first terminal device may be in the same location, and the user may wish to authenticate one of the plurality of second terminal devices by transmitting the status information of the first terminal device to that second terminal device. Moreover, the second terminal devices may all transmit the predetermined information to the server. So the server may need to distinguish at which second terminal device in particular the user wishes to obtain the status information. To prevent the server from transmitting the status information to the second terminal device that should not receive the status information, the server may assign an identification code to each of the plurality of second terminal devices, so the second terminal devices can be distinguished by the identification codes.

In some embodiments, the identification codes may be generated by the server based on a predetermined algorithm. For example, the predetermined algorithm may include a random function or a hash algorithm.

Step S53: the identification codes may be transmitted to the identified second terminal devices.

In some embodiments, the second terminal device may display the identification code, so that the user can select, confirm, and/or designate the terminal device to obtain the status information according to the identification code displayed by the terminal device.

Step 55: the identification codes may be transmitted to the first terminal device.

In some embodiments, the first terminal device may display the identification code, so that the user can distinguish between different second terminal devices according to the identification code displayed by the first and/or the second terminal devices. When there is a plurality of second terminal devices, the first terminal device can display an identification code list, and each second terminal device displays the corresponding identification code, so the user can see the identification code displayed on a certain second terminal device, and correspondingly look up the same identification code from the list displayed by the first terminal device. The user can select, confirm, and/or designate the second terminal device to obtain the status information by clicking from the identification code list displayed by the first terminal device. The first terminal device can monitor whether the click event occurs on the displayed identification code. For example, the first terminal device may be provided with a touch screen, and the user can click on a position on the touch screen corresponding to the identification code, or click on the identification code using a mouse device.

Step S57: the identification codes transmitted by the first terminal device and/or the second terminal device may be received.

In some embodiments, after the corresponding identification code is displayed by the second terminal device, the user can enter the corresponding identification code of the second terminal device needing to obtain the status information to the first terminal device, so the first terminal device can feed the identification code back to the server so that the sever confirms the second terminal device needing to receive the status information. The user can also enter the corresponding identification code of the second terminal device needing to obtain the status information to the second terminal device, and the second terminal device transmits the identification code to the server, so that the server confirms the second terminal device that needs to receive the status information. Moreover, the user can also enter the corresponding identification code of the second terminal device that needs to obtain the status information to the first and second terminal device, and the first and second terminal device respectively feed the identification code back to the server.

Step S59: the status information may be transmitted to the second terminal device identified by the received identification code.

In some embodiments, the first terminal device may receive the identification code transmitted by the server, the first terminal may then transmit one of the received identification codes to the server according to an operation of the user. Accordingly, the second terminal device that needs to obtain the status information may be specified.

In some embodiments, there may be a plurality of second terminal devices. The second terminal devices may display the identification codes after receiving the identification codes. The user may input the identification code to the first terminal device, and thereby confirming the terminal device that needs to receive the status information based on the identification code. When the user selects one of the plurality of second terminal devices to receive the status information, the identification code displayed by the second terminal device may be transmitted to the first terminal device. The first terminal device may then transmit the identification code to the server. After the server receives the identification code, the server may transmit the status information to the second terminal device corresponding to the identification code based on the corresponding relationship between the identification code and the second terminal device.

Figure 13:
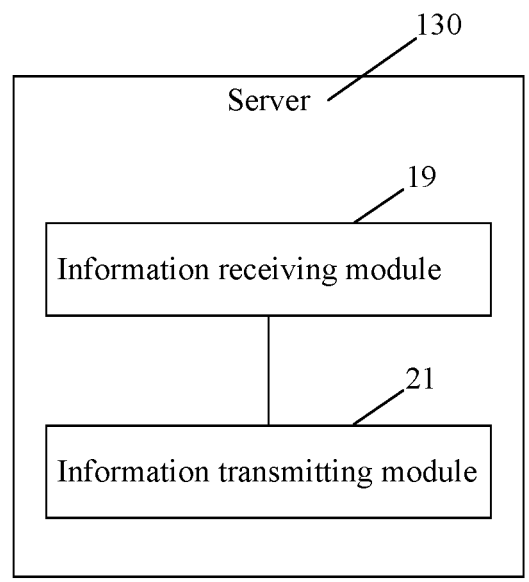
FIG. 13 is a functional block diagram of an exemplary server, according to an embodiment of the present application.

FIG. 13 shows an exemplary implementation of server 130, which may comprise an information receiving module 19 and an information transmitting module 21.

The information receiving module 19 may be used for receiving first predetermined information with status information indicating that the first terminal device completes login and first location information indicating a current location of the first terminal device, and receiving second predetermined information with second location information indicating a current location of the second terminal device.

In some embodiments, the status information may be used for indicating the status that the first terminal device is authenticated. For example, the status information may comprise a character string formed in accordance with a predetermined rule. The status information may also comprise account and/or password information. Specifically, for example, the status information can be a session identifier, e.g., Session ID, established between the server and the first terminal device.

In some embodiments, receiving the first predetermined information by the information receiving module 19 may indicate that the status information of the first terminal device needs to be obtained by the second terminal device, so that the authentication of the second terminal device can be completed according to the status information. There are many ways of arranging the status information and the first location information. For example: the status information and the first location information may be used as the content of the first predetermined information. The status information may be separated from the first location information. In another example, one of the status information and the first location information may be used as the content of the first predetermined information. The other may be used as an attachment to the first predetermined information. In yet another example, a predetermined character string may be used as the content of the first predetermined information. In yet another example, both the status information and the first location information may be used as attachments to the first predetermined information.

The first location information may indicate the current location of the first terminal device. The first location information can be generated by satellite positioning. For example, the first terminal device may be provided with a GPS module. The first location information can also be generated by base station positioning. For example, the first terminal device may be provided with a GSM chip or CDMA chip, etc. The first location information may also by generated by network IP positioning.

In some embodiments, receiving the second predetermined information by the information receiving module 19 may indicate that the status information of the first terminal device needs to be obtained by the second terminal device. There are many ways of arranging the second predetermined information and the second location information. For example: the second location information may be used as the content of the second predetermined information. In another example, the second location information may be used as an attachment of the second predetermined information. In yet another example, a predetermined character string may be used as the content of the second predetermined information.

The second location information may indicate the location of the second terminal device. The second location information may be generated by satellite positioning. For example, the second terminal device may be provided with a GPS module. The second location information can also be generated by base station positioning. For example, the second terminal device may be provided with a GSM chip or CDMA chip, etc. The second location information may also by generated by network IP positioning.

The information transmitting module 21 may be used for transmitting the status information to the second terminal device when the first location information and the second location information indicate the same location.

In some embodiments, the server 130 may compare the locations indicated by the first and second location information. The server 130 may communicate with a plurality of terminal devices, all of which can transmit location information to the server 130, but do not necessarily have to synchronize the login information to the same account. Therefore, the server 130 may determine whether the terminal devices are in the same location based on the received location information.

In some embodiments, if it is determined that the first location information and the second location information indicate substantially the same location, the server 130 may confirm that the first terminal device and the second terminal device are co-located and both transmit the predetermined information, indicating that the status information of the first terminal device is to be transmitted to the second terminal device for authenticating the second terminal device. The information transmitting module 21 may then transmit the status information received from the first terminal device to the second terminal device at this time.

From the technical scheme provided by the embodiment of the application, it can be seen that after a terminal device is authenticated, this terminal device and another terminal device that needs to be authenticated transmit predetermined information to a server. The server transmits the status information of the authenticated terminal device to the terminal device that needs to be authenticated, so that the authentication can be completed based on the status information, and the user can avoid re-entering account and password information and enjoy the convenience.

The specification has described systems and methods for interaction among terminal devices and servers. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method, implemented by a processor device of a server, for providing authentication, the method comprising:
    sending, to a first terminal device, a first predetermined signal, the first predetermined signal including a voltage input received by a predetermined port of the first terminal device;
    receiving, from the first terminal device, status information and first location information, wherein the status information indicates that the first terminal device is authenticated and includes a session identifier of a communication session established between the server and the first terminal device, and the first location information indicates a current location of the first terminal device;
    sending, to a second terminal device, a second predetermined signal, the second predetermined signal including a voltage input received by a predetermined port of the second terminal device;
    receiving, from the second terminal device, second location information indicating a current location of the second terminal device;
    comparing the first and second location information to determine whether the first and second terminal devices are co-located; and
    when it is determined that the first and second terminal devices are co-located, transmitting the status information to the second terminal device to authenticate the second terminal device, wherein the communication session started on the first terminal device is continued on the second terminal device using the session identifier.

2. The method of claim 1, comprising:
generating an identification code indicating an identity of the second terminal device; and transmitting the identification code to at least one of the first or second terminal device.

3. The method of claim 2, comprising:
receiving, from at least one of the first or second terminal device, the identification code; and
transmitting the status information to the second terminal device indicated by the received identification code.

4. The method of claim 1, comprising:
receiving a first time stamp from the first terminal device;
receiving a second time stamp from the second terminal device;
comparing the first and second time stamps to determine a difference between the first and second time stamps; and
transmitting the status information to the second terminal device when the difference between the first and second time stamps is within a predetermined range.

5. A server, comprising:
a transceiver device configured to transmit or receive information from first and second terminal devices; and
a processor device configured to:
    send, to a first terminal device, a first predetermined signal, the first predetermined signal including a voltage input received by a predetermined port of the first terminal device;
    receive, from the first terminal device, status information and first location information, wherein the status information indicates that the first terminal device is authenticated and includes a session identifier of a communication session established between the server and the first terminal device, and the first location information indicates a current location of the first terminal device;

send, to a second terminal device, a second predetermined signal, the second predetermined signal including a voltage input received by a predetermined port of the second terminal device;

receive, from the second terminal device, second location information indicating a current location of the second terminal device;

compare the first and second location information to determine whether the first and second terminal devices are co-located; and when it is determined that the first and second terminal devices are co-located, control the transceiver to transmit the status information to the second terminal device to authenticate the second terminal device, wherein the communication session started on the first terminal device is continued on the second terminal device using the session identifier.

6. The server of claim 5, wherein the processor device is further configured to:

generate an identification code indicating an identity of the second terminal device; and control the transceiver device to transmit the identification code to at least one of the first or second terminal device.

7. The server of claim 6, wherein the processor device is further configured to:

control the transceiver to receive, from at least one of the first or second terminal device, the identification code; and control the transceiver to transmit the status information to the second terminal device indicated by the received identification code.

8. The server of claim 5, wherein the processor device is further configured to:

control the transceiver to receive a first time stamp from the first terminal device; control the transceiver to receive a second time stamp from the second terminal device;

compare the first and second time stamps to determine a difference between the first and second time stamps; and control the transceiver to transmit the status information to the second terminal device when the difference between the first and second time stamps is within a predetermined range.

9. A non-transitory computer readable medium that stores a set of instructions that is executable by at least one processor of a server to cause the server to perform a method for providing authentication, the method comprising:

sending, to a first terminal device, a first predetermined signal, the first predetermined signal including a voltage input received by a predetermined port of the first terminal device;

receiving, from the first terminal device, status information and first location information, wherein the status information indicates that the first terminal device is authenticated and includes a session identifier of a communication session established between the server and the first terminal device, and the first location information indicates a current location of the first terminal device;

sending, to a second terminal device, a second predetermined signal, the second predetermined signal including a voltage input received by a predetermined port of the second terminal device;

receiving, from the second terminal device, second location information indicating a current location of the second terminal device;

comparing the first and second location information to determine whether the first and second terminal devices are co-located; and when it is determined that the first and second terminal devices are co-located, transmitting the status information to the second terminal device to authenticate the second terminal device, wherein the communication session started on the first terminal device is continued on the second terminal device using the session identifier.

10. The non-transitory computer readable medium of claim 9, wherein the set of instructions is executable by the at least one processor of the server to cause the first terminal device to further perform:

generating an identification code indicating an identity of the second terminal device; and transmitting the identification code to at least one of the first or second terminal device.

11. The non-transitory computer readable medium of claim 10, wherein the set of instructions is executable by the at least one processor of the server to cause the first terminal device to further perform:

receiving, from at least one of the first or second terminal device, the identification code; and transmitting the status information to the second terminal device indicated by the received identification code.

12. The non-transitory computer readable medium of claim 9, wherein the set of instructions is executable by the at least one processor of the server to cause the first terminal device to further perform:

receiving a first time stamp from the first terminal device; receiving a second time stamp from the second terminal device;

comparing the first and second time stamps to determine a difference between the first and second time stamps; and transmitting the status information to the second terminal device when the difference between the first and second time stamps is within a predetermined range.

* * * * *